United States Patent [19]

Zibell

[11] Patent Number: 5,217,735
[45] Date of Patent: Jun. 8, 1993

[54] METHOD OF MAKING CHEWING GUM WITH DELAYED RELEASE INGREDIENTS

[75] Inventor: Steven E. Zibell, Palos Heights, Ill.

[73] Assignee: Wm. Wrigley Jr. Company, Chicago, Ill.

[21] Appl. No.: 383,291

[22] Filed: Jul. 17, 1989

Related U.S. Application Data

[63] Continuation of Ser. No. 205,495, Jun. 6, 1988, abandoned, which is a continuation of Ser. No. 921,753, Oct. 22, 1986, abandoned.

[51] Int. Cl.$^5$ ............................................. A23G 3/30
[52] U.S. Cl. ........................................ 426/3; 426/285; 426/4; 426/5; 426/6; 426/96
[58] Field of Search ............................. 426/285; 3-6, 426/96

[56] References Cited

U.S. PATENT DOCUMENTS

| | | | |
|---|---|---|---|
| Re. 29,682 | 6/1978 | Cella et al. | 426/548 |
| 3,262,788 | 7/1966 | Swanson et al. | 426/285 X |
| 3,753,739 | 8/1973 | Cella et al. | 99/141 A |
| 3,922,354 | 11/1975 | Galluzzi et al. | 426/96 |
| 3,928,633 | 12/1975 | Shoaf et al. | 426/96 |
| 3,956,507 | 5/1976 | Shoaf et al. | 426/96 |
| 3,962,468 | 6/1976 | Pischke et al. | 426/96 |
| 4,004,039 | 1/1977 | Shoaf et al. | 426/548 |
| 4,059,706 | 11/1977 | Pischke et al. | 426/548 |
| 4,139,639 | 2/1979 | Bahoshy et al. | 426/3 |
| 4,230,687 | 10/1980 | Sair et al. | 424/22 |
| 4,384,004 | 5/1983 | Cea et al. | 426/3 |
| 4,384,005 | 5/1983 | Mc Sweeney | 426/285 X |
| 4,465,694 | 8/1984 | Okada | 426/3 |
| 4,495,213 | 1/1985 | Wolf et al. | 426/285 X |
| 4,497,835 | 2/1985 | Winston | 426/72 |
| 4,517,214 | 5/1985 | Shoaf et al. | 426/548 |
| 4,554,167 | 11/1985 | Sorge et al. | 426/285 |
| 4,579,747 | 1/1986 | Sugiyama et al. | 426/548 |
| 4,597,970 | 7/1986 | Sharma et al. | 426/5 |
| 4,634,593 | 1/1987 | Stroz et al. | 426/5 |
| 4,704,288 | 11/1987 | Tsau et al. | 426/99 |

FOREIGN PATENT DOCUMENTS

| | | | |
|---|---|---|---|
| 675004 | 11/1963 | Canada | 426/285 |
| 86810619 | 7/1987 | European Pat. Off. | |
| 87301903 | 9/1987 | European Pat. Off. | |
| 59-95862 | 6/1984 | Japan | |
| 58-49762 | 3/1985 | Japan | |
| 1274905 | 5/1972 | United Kingdom | 426/285 |
| 1301770 | 1/1973 | United Kingdom | 426/285 |

OTHER PUBLICATIONS

Hawley, The Condensed Chemical Dictionary, 10th Ed., 1981, Van Nostrand Reinhold Co., New York, p. 552.

Primary Examiner—Joseph Golian
Attorney, Agent, or Firm—Willian Brinks Olds Hofer Gilson & Lione

[57] ABSTRACT

A process is disclosed wherein an ingredient is treated so that it will exhibit a controlled release when incorporated in chewing gum. According to the method, a quantity of a powdered ingredient is mixed with an agglomerating agent, such as a modified cellulose, and a limited quantity of a solvent for the agglomerating agent, such as water. The quantity of solvent is limited so as to produce a mixture which is only moist or damp. This damp mixture is characterized as being dust-free, non-flowing and crumbly. The damp mixture is then dried and the dried mixture is treated, e.g. by grinding and/or screening, to produce the desired particle size range in the agglomerated ingredient particles. These agglomerated particles comprise collections or clusters of ingredient particles which have been bound together by the agglomerating agent.

26 Claims, 5 Drawing Sheets

(100X)

(100X)

(100X)

(100X)

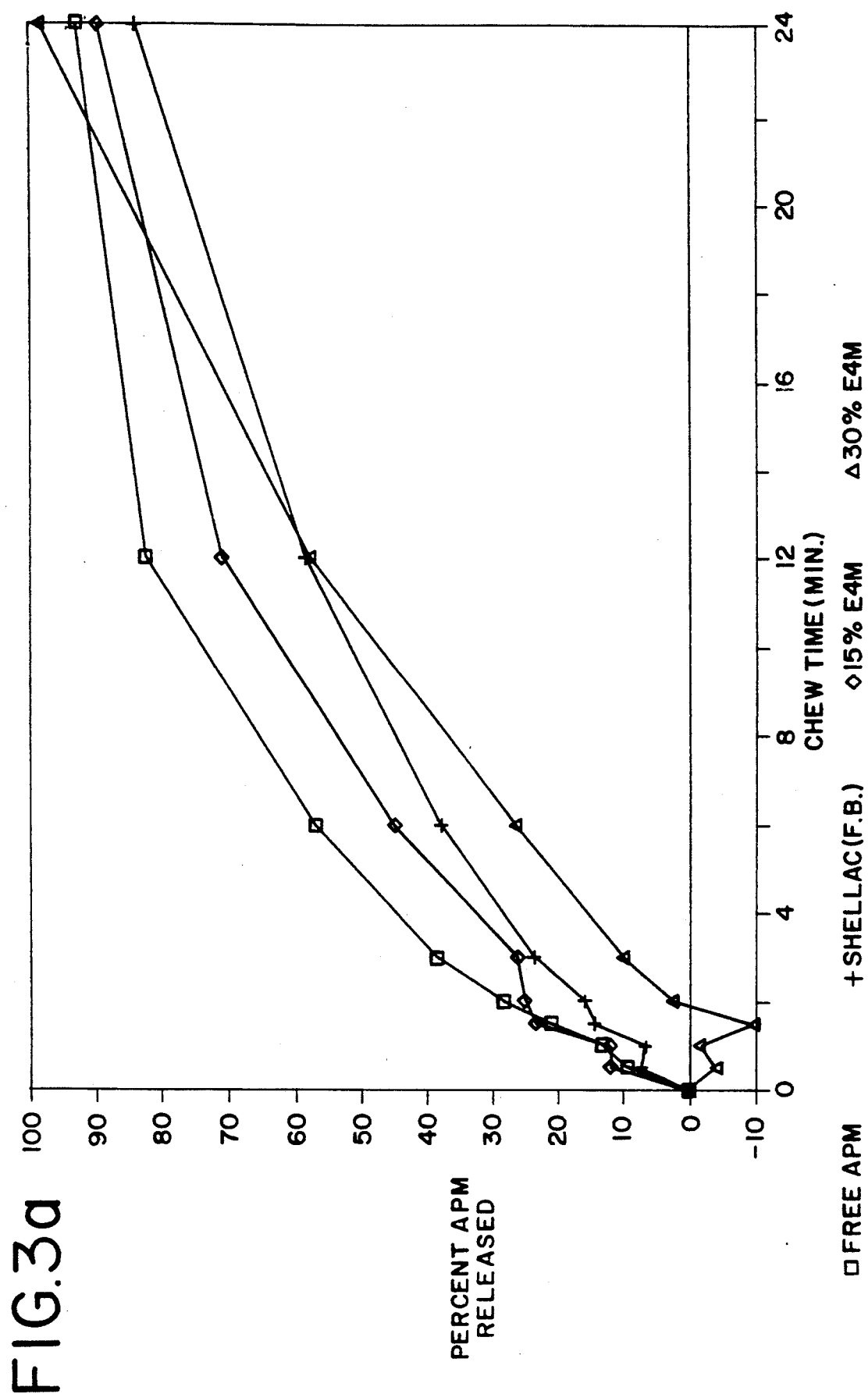

METHOD OF MAKING CHEWING GUM WITH DELAYED RELEASE INGREDIENTS

CROSS-REFERENCE TO RELATED APPLICATIONS

The present application is a continuation of U.S. patent application Ser. No. 205,495, filed Jun. 6, 1988, now abandoned, which application is in turn a continuation of U.S. patent application Ser. No. 921,753, filed Oct. 22, 1986 now abandoned by the same inventor and assigned to the same assignee.

BACKGROUND OF THE INVENTION

The present invention relates to methods for producing controlled release ingredients for use in chewing gum.

In recent years, effort has been devoted to controlling the release characteristics of various ingredients in chewing gum. Most notably, attempts have been made to delay the release of sweeteners and flavors in various chewing gum formulations to thereby lengthen the satisfactory chewing time of the gum. Delaying the release of sweeteners and flavors can also avoid an undesirable overpowering burst of sweetness or flavor during the initial chewing period. On the other hand, some ingredients have been treated so as to increase their rate of release in chewing gum. In addition, other efforts have been directed at delaying or preventing altogether the release of active ingredients in the chewing gum formulation during storage of the gum, to thereby increase the stability of the ingredient over time.

For example, U.S. Pat. No. 4,597,970 to Sharma et al., teaches a process for producing an agglomerated sweetener wherein the sweetener is dispersed in a hydrophobic matrix consisting essentially of lecithin, a glyceride, and a fatty acid or wax having a melting point between 25° and 100° C. The method disclosed uses a spray congealing step to form the sweetenercontaining matrix into droplets followed by a fluid bed second coating on the agglomerated particles.

U.S. Pat. Nos. 4,515,769 and 4,386,106, both to Merrit et al., teach a two step process for preparing a delayed release flavorant for chewing gum. In this process, the flavorant is prepared in an emulsion with a hydrophyllic matrix. The emulsion is dried and ground and the particles are then coated with a water impermeable substance.

U.S. Pat. No. 4,230,687, to Sair et al., teaches a process for encasing an active ingredient to achieve gradual release of the ingredient in a product such as chewing gum. The method described involves adding the ingredient to an encapsulating material in the form of a viscous paste. High shear mixing is used to achieve a homogeneous dispersion of the ingredient within the matrix which is subsequently dried and ground.

U.S. Pat. No. 4,139,639, to Bahoshy et al., teaches a process of "fixing" aspartame by co-drying (by spray or fluid bed drying) a solution containing aspartame and an encapsulating agent, such as gum arabic, to thereby surround and protect the aspartame during storage in the gum.

U.S. Pat. No. 4,384,004, to Cea et al., teaches a method of encapsulating aspartame with various solutions of encapsulating agents using various encapsulation techniques such as spray drying in order to increase the shelf-stability of the aspartame.

Naturally, the processes which use spray drying or fluid bed techniques for encapsulating the ingredients involve a relatively large investment in equipment and require skilled operating personnel and sophisticated process controls.

SUMMARY OF THE INVENTION

The present invention is directed to improved methods for producing a controlled release ingredient for chewing gum.

Briefly stated, the methods of the present invention generally comprise the following steps A quantity of a powdered ingredient is mixed with an agglomerating agent, such as a modified cellulose, and a limited quantity of a solvent, such as water. The quantity of solvent is limited so as to produce a mixture which is only moist or damp. This damp mixture is characterized as being dust-free, non-flowing and crumbly. The damp mixture is then dried. The dried mixture is treated, e.g. by grinding and/or screening, to produce the desired particle size range in the agglomerated ingredient particles. These agglomerated particles comprise collections or clusters of ingredient particles which have been bound together with the agglomerating agent.

In accord with one preferred embodiment of the present invention, the ingredient to be treated is the high-potency artificial sweetener known as aspartame and the agglomerating agent is hydroxypropyl methylcellulose (HPMC). The aspartame is dry blended with the HPMC in an amount so as to comprise about 15 percent HPMC by weight of the agglomerated aspartame. The mixing is accomplished in a planetary or other type mixer which affects compressive forces between the components. Water is added to the dry blend in small increments while mixing until it is present in an amount of about 36 percent of the damp mixture. The damp mixture is spread out on trays and dried at about 170° F. for 12 to 14 hours. After drying, the mixture preferably has between 2 and 3 weight percent water. The dried mixture is then ground in a high speed grinder with a 0.05 inch screen.

The present invention offers advantages in that it provides a relatively simple and inexpensive method for treating ingredients to produce a controlled release in chewing gum. In particular, the method of the present invention can be carried out in a relatively short time and using relatively simple equipment. It was a surprising result that this relatively simple and inexpensive process could produce agglomerated ingredients with controlled release profiles similar to ingredients treated by more complicated and expensive processes. Moreover, although the present invention may be carried out in a continuous process, it is also well suited for batch processes. This is particularly important in view of the small quantities of the ingredients typically used.

It should be noted that the phrase "controlled release ingredient" as used in this specification and appended claims is intended to refer to an ingredient which has been treated so as to exhibit a different release profile than the ingredient possesses without such treatment. In other words, the present invention contemplates various modifications of release rates of chewing gum ingredients, such as decreasing or increasing the release rate or changing the order of the release rate. In the context of the present invention, the phrase "controlled release" can also refer to increasing the shelf-life stability of an ingredient in chewing gum by preventing or delaying release of the ingredient into the chewing gum during storage. In other words, causing the ingredient to have a "controlled release" can also refer to protecting the ingredient from the other components of the chewing gum during storage.

These and other advantages of the present invention will become apparent from the following description which, when taken in conjunction with the accompanying figures, discloses presently preferred methods of the present invention.

BRIEF DESCRIPTION OF THE DRAWINGS

FIGS. 3a and 3b are graphs comparing the controlled release characteristics of various products of the present invention together with untreated aspartame and conventionally treated aspartame.

DETAILED DESCRIPTION

Figure 1:
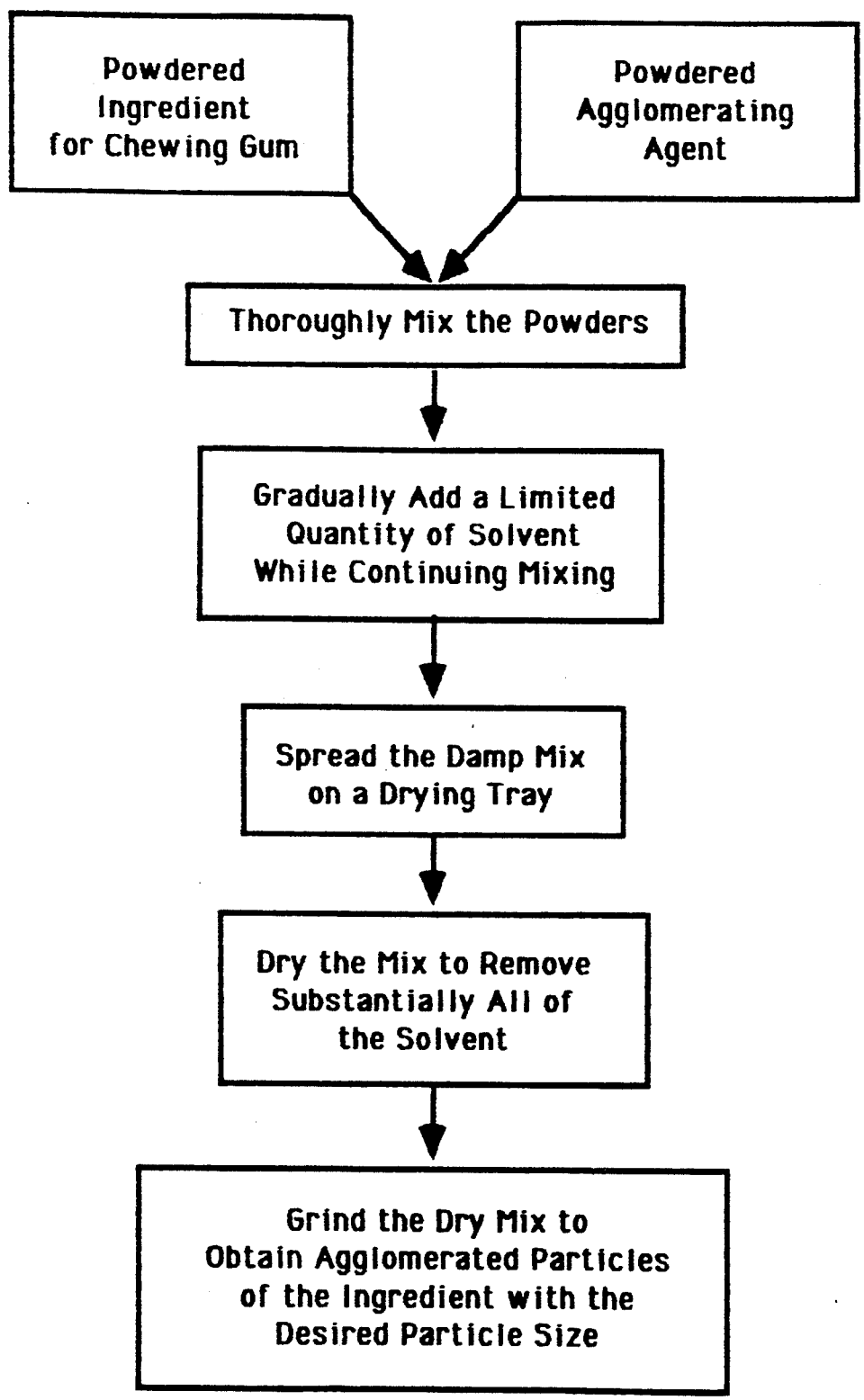
FIG. 1 is a schematic representation of the preferred method of the present invention.

Referring to the drawings, FIG. 1 is a block diagram illustrating the steps in the process of the preferred embodiment of the present invention. First, a quantity of powdered ingredient is mixed with a quantity of powdered agglomerating agent. The powdered ingredient can be selected from a wide variety of chewing gum ingredients, such as sweeteners, flavors, acidulants, medicaments, etc. Preferably, the ingredient is a high-potency sweetener, such as aspartame, acesulfame K, alitame, sacharine and its salts, cyclamic acid and its salts, dihydrochalcones, thaumatin, and monellin, etc.

Figure 2A:
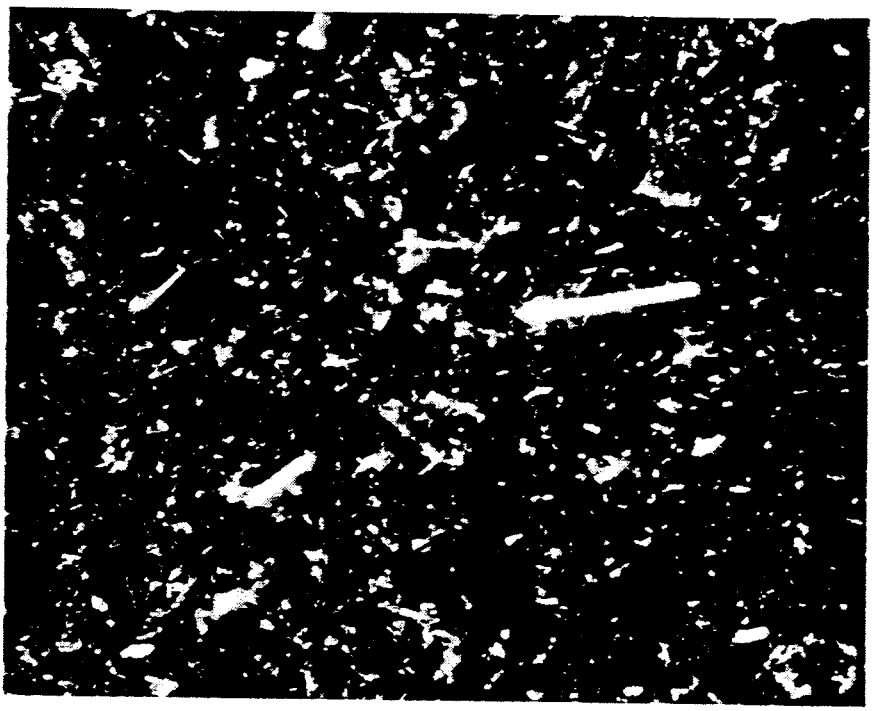
FIGS. 2a is a photomicrograph of untreated aspartame crystals.

Most preferably the high-potency sweetener used in this invention is the dipeptide sweetener L-aspartic acid ester of L-phenylalanine, generally known as aspartame. The aspartame used in the most preferred embodiment, is obtained from the G.D. Searle Company under their designation "NutraSweet ®." This is a powdered form with generally needle shaped crystals having a wide range of particle sizes. FIG. 2a is a photomicrograph at 100× showing the form of the
crystals before treatment by the present As can be seen, the crystals are relatively small and needle-like. Generally, this powder is considered difficult to work with because of its poor flowability and low bulk density In particular, it is relatively difficult to coat these individual aspartame crystals because of their small size and needle-like shape.

In alternatively preferred embodiments, the high-potency sweetener is the potassium salt of 6-methyl-1.2.3-oxathiazin-4(3H)-one-2.2-dioxide, generally known as acesulfame K. In other alternatively preferred embodiments, the high-potency sweetener is L-aspartyl-D-alanine 2,2,4,4 tetramethyl-thienyl-amide, generally known as alitame.

The present invention also contemplates the inclusion of more than one ingredient. That is, two or more chewing gum ingredients may be mixed together before or during the present process For example, it may be desirable to blend a sweetener and a flavor together so as to produce agglomerated particles that will cause a controlled release of both ingredients.

The powdered agglomerating agent may be selected from a wide variety of agglomerating agents. Examples of suitable agglomerating agents include
modified cellulose compounds, such as hydroxypropyl methylcellulose (HPMC); gums, such as gum arabic; shellac; alcohol soluble proteins, such as zein; starches; maltodextrins; lactose; carbohydrate syrups; polymers, such as polyolefins, polyesters, polyvinyl acetate; etc. Plasticizers and conditioners for the agglomerating agents can also be used.

Modified cellulose compounds are preferred for use with sweeteners, with HPMC being used in the most preferred embodiment with aspartame. The HPMC used in the most preferred embodiment is obtained from the Dow Chemical Company from their METHOCEL line under the specific designation "E4M."

The present invention contemplates the simultaneous use of more than one agglomerating agent. For example, two or more different types or grades of HPMC could be blended so as to modify the properties of the agent as a whole. In addition, it may be desirable to use two or more agglomerating agents which have different solubility properties to thereby produce a stepped release of the product when used.

The present invention also contemplates the use of more than one agglomerating step whereby more than one layer of agglomerating agent can be applied to the clusters of agglomerated ingredient particles. Depending on the results desired, it may be desirable to use either the same or different agglomerating agents in each of the layers.

The relative proportion of agglomerating agent to ingredient depends on the specific ingredient and agglomerating agent selected In addition, the amount of agglomerating agent used will depend on the release profile which is being sought for the ingredient. Generally, using more agglomerating agent will result in a slower release of the ingredient when the gum is chewed.

Naturally, the amount of agglomerating agent should be kept below the level at which it would adversely affect the flavor or texture of the chewing gum. Preferably, the agglomerating agent will comprise between about 1 and about 65 weight percent of the agglomerated ingredient, i.e. percent by combined weight of the ingredient and the agglomerating agent. In the most preferred embodiment, the HPMC is added to between about 5 and about 50 percent by weight of the agglomerated ingredient, even more preferably between about 10 and about 30 percent.

As shown in FIG. 1, the ingredient and agglomerating agent are preferably well blended in their dry form before any addition of solvent. In the most preferred embodiment, this is accomplished by simply adding the two powdered components to a mixer bowl of a planetary type mixer. The mixer is activated for a time sufficient to thoroughly intermix the two powders. This dry blending of the ingredient and the agglomerating agent is thought to be desirable in that the two components are thus uniformly dispersed in one another prior to the addition of the limited quantity of solvent, thereby providing for more uniform dispersion during the solvent addition and in the final agglomerated product.

In alternative embodiments, the solvent may be added to the agglomerating agent before it is added to the ingredient. For example, a carbohydrate syrup can be used in the present process and thus act as both the agglomerating agent and the solvent. Other agglomerating agents can likewise be pre-mixed with their solvent before being added to the ingredient. For example, shellac is preferably used with an ethanol solvent already present.

In other alternative embodiments, the solvent may be added to the high-potency sweetener before the agglomerating agent is added.

Referring again to the preferred embodiment illustrated in FIG. 1, after the dry ingredient and dry agglomerating agent are thoroughly mixed, a solvent, i.e. a solvent for the agglomerating agent and/or the ingredient, is added to the mix. Naturally, the selection of solvent will depend on the selection of the agglomerating agent and/or the ingredient. When using HPMC in the preferred embodiment, the preferred solvent is water. When using shellac or zein as the agglomerating agent, the preferred solvent is ethanol. Certainly, it is important to avoid solvents which would be unsafe for use in making food products.

The total amount of solvent added will also depend on the selection of the agglomerating agent. As stated, the amount of solvent is intentionally limited so as to produce a damp, dust-free, non-flowable, non-extrudable, crumbly mixture. By the word "crumbly" it is meant that the damp mix easily separates from itself. By way of comparison, the damp mix should have the consistency and texture of wet sand. By way of contrast, the damp mix should not have so much solvent that it becomes dough-like, paste-like, clay-like, or soup-like. It has been found that, if the mix does go to the dough-like stage, many of the advantages of the present invention are lost. In particular, the dough-like mix is more difficult to mix, handle, and dry and considerably more difficult to achieve the desired particle sizes.

The preferred method of adding the solvent to the mix is to add it in small amounts in time spaced increments while continuously mixing. When adding the solvent this way, it is desirable to allow the mix to become homogeneous before the next addition of solvent. In following this preferred method, the solvent is allowed to be absorbed slowly into the mixture without producing pools of solvent which can result in large clay-like lumps in the mixture.

It has been found that one method of determining when there is sufficient solvent added is to monitor the power demand for the mixer. In particular, the power demand increases dramatically as the mix goes from the desired damp mix stage to a dough-like stage. This is believed to be due to the fact that, in the desired damp mix stage, the mix is crumbly, i.e. easily separable; whereas when the mix moves into the clay-like stage, the mix become more cohesive. As a result, the power demand on the mixer can be monitored and the solvent addition stopped just as the power demand begins a sharp rise.

It is also possible to determine the proper amount of solvent by visually monitoring the condition of the damp mix. The characteristics mentioned above, namely dust-free, non-flowable, and crumbly, are relatively easy to observe and contrast with the cohesiveness, and flowability of the dough-like stage.

Naturally, once the optimum amount of solvent is determined for a particular agglomerating agent and a particular weight ratio of agglomerating agent to ingredient, that optimum amount will be reproducible.

In the most preferred embodiment, wherein aspartame is agglomerated with HPMC, the water is added so as to comprise between about 20 and about 55 percent by weight of the damp mix, more preferably between about 30 and about 40 percent, and most preferably about 37 percent. When zein is used to agglomerate aspartame, ethanol is most preferably present in an amount between about 25 and about 50 percent by weight of the damp mix. Likewise, when pre-solvated shellac is used to agglomerate aspartame, ethanol is preferably present in an amount between about 7 and about 15 percent by weight of the damp mix.

After the last of the solvent is added, the combination is continuously mixed for a time sufficient to allow for a homogenous mass. In particular, the solvated and unsolvated ingredient, the solvated and unsolvated agglomerating agent, and any free solvent should all be evenly dispersed in the mix. The optimum time of mixing can be determined visually.

The type of mixing affected on the mix is believed to be important to the present invention. In particular, it is believed that a compressive type mixing is important in order to push the solvated agglomerating agent and the particles of ingredient together into clusters. This is contrasted with a high shear type mixing which would act to separate the components of the damp mix. Accordingly, the preferred type of mixer is a planetary mixer or other type mixer that would give similarly compressive type mixing.

After the final mixing, the damp mix is dried. Preferably, substantially all of the solvent will be removed from the mix. The drying is preferably accomplished by taking the damp mix out of the mixer bowl and spreading it on drying trays. It has been found preferable to line the drying trays with paper to facilitate removal of the dried product. In the most preferred embodiment, the damp mix is spread on trays at a depth of about 2 cm.

Preferably, the drying is accomplished by placing the trays in a drying oven at a temperature and for a time sufficient to drive off substantially all of the solvent. Naturally, the temperature and time for drying will depend on the specific solvent and amount of solvent used as well as factors such as the thermal or moisture stability of the ingredient. Accordingly, it may be desirable to allow the damp mix to dry at ambient conditions. In the most preferred embodiment, the aspartame agglomerated with HPMC is dried at about 170° F. for 12 to 14 hours.

Another factor which can influence the temperature of drying, is whether it is desired to have the solvent boil as it leaves the particles. It is known in the art that, if the solvent boils during drying, the coating left on the particles has a tendency to be porous due to bubbling. This porousness may be desirable in certain embodiments wherein a fast release is desired.

After drying in the most preferred embodiment, the agglomerated aspartame has been found to have a water content of between about 2 and 3 percent by weight of the total. The acceptable level of solvent left in the agglomerated ingredient particles may be higher or lower than this amount and will depend on the nature of the ingredient and agglomerating agent used. Naturally, if the ingredient is subject to deterioration in the presence of the solvent, or if the solvent is not compatible with the gum formulation in which the agglomerated ingredient is to be used, it is important to drive off as much of the solvent as possible.

After drying, the mix is generally characterized as being in the form of hard, dry lumps of various shapes and sizes. At this point, the dry mix is ready to be treated to produce the desired range of particle sizes. This can be accomplished in various ways. Most preferably, the dried mix is fed into a grinder which comminutes the mix into smaller particles. Other devices such as a roller mill can also be used to comminute the dried mix. The grinder or other device is preferably equipped with a screen which will pass the desired particle size range. If desired, other techniques such as a second screen or a cyclone separator can be used to ensure a minimum particle size as well as a maximum particle size. Presently, a screen with 0.05 inch holes is used to produce the agglomerated aspartame particles of the most preferred embodiment.

Figure 2B:
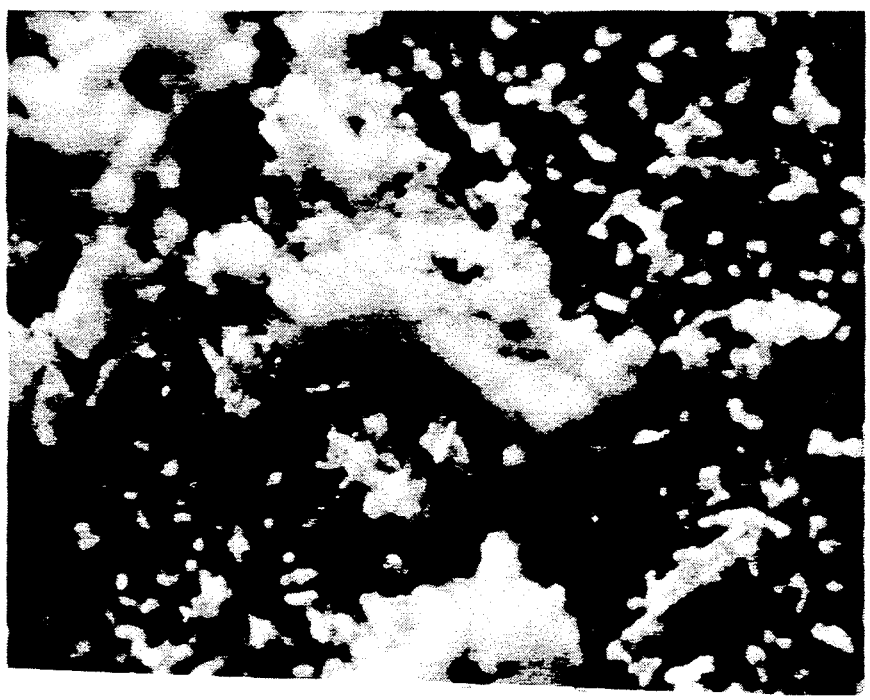
FIG. 2b is a photomicrograph of a product of the most preferred method of the present invention.

FIG. 2b is a photomicrograph at 100 X of the product of the most preferred embodiment of this invention. In particular, this product is aspartame crystals as shown in FIG. 2a which have been agglomerated with 15 percent by weight of the "E4M" HPMC described above. The dried mix was ground in a Fitzmill grinder having a screen with 0.05 inch holes. As can be seen, the product comprises collections or clusters of individual aspartame crystals which have been bound together by the HPMC. This photomicrograph also shows how the invention is useful to reduce the total surface area of the aspartame crystals. Thus, it is believed that the preferred embodiment delays the release of aspartame in chewing gum, not only by covering some of the crystals with agglomerating agent, but also by reducing the exposed surface area of the crystals.

The product also includes aspartame crystals which are not bonded to others. These unbonded crystals may have missed being bonded during the agglomerating process or they may have become disattached from clusters during the grinding process.

In the most preferred embodiment, only the maximum particle size is controlled. That is, the smaller particles are not held back. As a result, and as shown in FIG. 2b, there are small unbonded crystals in addition to the clusters. This result is believed to be preferable for particular ingredients in certain gum formulations. For example, in the most preferred embodiment, this is believed to produce the effect of allowing some smaller and/or unbonded particles of the aspartame to be released more quickly when the gum is chewed than the aspartame which is bound in the clusters. As a result, the release profile is such that the consumer experiences sufficient sweetness initially and subsequently.

In alternative embodiments, it may be desirable to control the maximum and the minimum particle size to produce a narrower range of particle sizes. This may be desired when it is intended for all of the ingredient to have a more uniform delayed release.

Figure 2C:
FIG. 2c and 2d are photomicrographs of products of alternative embodiments of the present invention.

FIG. 2c is a photomicrograph of a product similar to that of FIG. 2b except that the product shown had HPMC present in 30 percent by weight of the agglomerated aspartame (see Example 2). As can be seen, the clusters in this product have more HPMC around their external surfaces. Tests have shown that this 30 percent HPMC product provides a generally slower release the 15 percent HPMC product of Example 1 (See the graph in FIG. 3a).

Figure 2D:
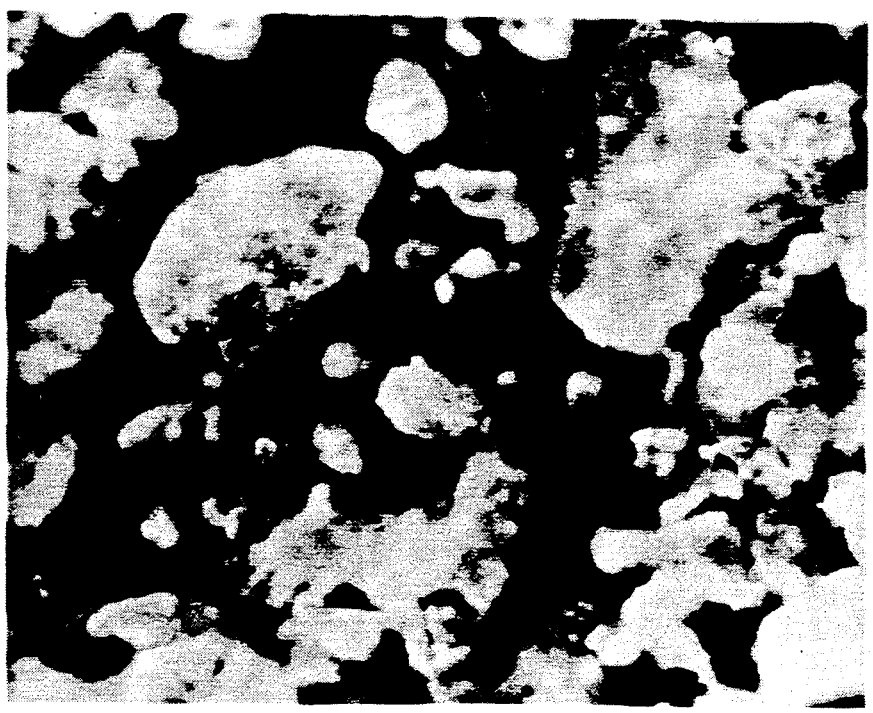

FIG. 2d is a photomicrograph at 100× of a product which was made according to the most preferred process described above except that zein was used as the agglomerating agent instead of HPMC (See example 5). The zein was used at a level of about 60 percent by weight of the aspartame. The solvent for the zein was ethanol which was present in about 27 weight percent of the damp mix. As can be seen in the photomicrograph, using zein at this level results in a product which is more crystalline. The release profile of this product is shown FIG. 3b.

EXAMPLES

The following examples are provided by way of explanation and illustration. Examples 1 through 14 were produced with aspartame as the ingredient. Examples 15 through 18 were produced with acesulfame K as the ingredient. Examples 19, 20, and 21 were produced with citric acid, tartaric acid, and ascorbic acid respectively.

Example 1 was carried out according to the most preferred embodiment of the present invention. In particular, 7711 g. of unmilled aspartame from the G.D. Searle Company was placed in the 40 qt. bowl of a Hobart mixer. 1361 g. of Methocel E4M from the Dow Chemical Co. was also added to the bowl. These two powders were dry blended at the low speed setting on the mixer for approximately 15 minutes. A total of approximately 4880 ml of water was added to this mix. This was accomplished by adding between 200 to 1000 ml of water every 3 to 5 minutes with the mixer running. The damp mix that resulted was dustless and coalesced when squeezed. The damp mix was mixed for about 5 minutes after the last water addition to insure complete interdispersion. The damp mix was transferred to stainless steel trays and spread to a depth of approximately 2 cm. At this point, the material was approximately 34.6 weight percent water, 9.8 weight percent HPMC and 55.6 weight percent aspartame. The trays were placed in an oven and heated to 170o for 12 to 14 hours. After drying the mix was ground in a Fitzmill at high speed while using a 0.05 inch screen. The water content of the final product was between 2 and 3 weight percent. The product of this example is shown in FIG. 2b.

Example 2 was carried out the same as Example 1 except that the batch size was much reduced. In particular, in Examples 2-21, the combined weight of the ingredient and the agglomerating agent was 50 g. In Example 2, the proportion of HPMC was double that used in Example 1, i.e. 15 g. of E4M was used with 35 g. of aspartame. Also, the water was present in the damp mix at about 42 percent by weight of the damp mix.

Example 3 was carried out the same as Example 2 except that a solution comprising 70 weight percent sorbitol and 30 percent water, was used in the place of the water. In addition, only 7.5 g. of E4M was used with 42.5 g. of aspartame to give agglomerated aspartame comprising 15 weight percent HPMC.

Example 4 was carried out the same as Example 2 except that 3.5 g. of HPMC was added to 50 ml of water to make a predissolved HPMC. 3.5 g. of this predissolved HPMC was then added to 46.5 g. of aspartame. Thus, the HPMC was present as about 0.5 percent by weight of the agglomerated aspartame. The total water content of the damp mix was approximately 6.5 percent.

Example 5 was carried out the same as Example 2 except that zein was used as the agglomerating agent. The zein was acquired from Freeman Industries Inc. as their regular grade. The solvent used was ethanol at 27 weight percent of the damp mix. The zein was present as 60 weight percent of the agglomerated aspartame. The product of this example is show in FIG. 2d.

Example 6 was carried out the same as Example 5 except the zein was present as 40 weight percent of the agglomerated aspartame. The ethanol solvent was present as 37 weight percent of the damp mix.

Example 7 was carried out the same as example 5 except that a different grade of zein was used. In particular, the zein was obtained in a finer particle size. In addition water was used as the solvent at 38 weight percent of the damp mix. The zein was present as 60 weight percent of the agglomerated aspartame.

Example 8 was carried out the same as Example 7 except that ethanol was used as the solvent at 40 weight percent of the damp mix.

Example 9 was carried out the same as Example 2 except that shellac in an ethanol solution was used as the agglomerating agent. The shellac was obtained from Bradshaw and Prager as their Food Grade 6 #cut confectioner's dewaxed lac glaze. The ethanol was present at about 25 weight percent of the damp mix. The shellac was present as 15 weight percent of the dried, agglomerated aspartame particles.

Example 10 was carried out the same as Example 2 except that gum arabic was used as the agglomerating agent. The gum arabic was obtained in spray dried form from Meer Corporation. The solvent was water present at 32 weight percent of the damp mix. The gum arabic was present at 15 weight percent of the agglomerated aspartame.

Example 11 was carried out the same as Example 10 except that ethanol was used as the solvent for the gum arabic. The ethanol was present at about 45 weight percent of the damp mix.

Example 12 was carried out the same as Example 2 except that a maltodextrin was used as the agglomerating agent. The maltodextrin was obtained from Grain Processing Corp. under the designation "Maltrin 150." It had a dextrose equivalency of 13-17. The water solvent was present at about 31 weight percent of the damp mix.

Example 13 was carried out the same as Example 2 except that a starch was used as the agglomerating agent. The starch was obtained from the A.E. Staley Company under the designation "Binasol 15." The water solvent was present at about 41 weight percent of the damp mix.

Example 14 was carried out the same as Example 2 except that a gelatin was used as the agglomerating agent. The gelatin was obtained from Grayslake Gelatin Co. as a 250 Bloom type A gelatin powder. The water solvent was present at about 52 weight percent of the damp mix.

Example 15 was carried out the same as Example 5 except that the high-potency artificial sweetener known as acesulfame K was used as the ingredient. The acesulfame K was obtained from Hoechst. Zein was the agglomerating agent and was added to 60 weight percent of the acesulfame K. The ethanol solvent was present at 21 weight percent of the damp mix.

Example 16 was carried out the same as Example 15 except that a modified cellulose was used as the agglomerating agent. Specifically, the modified cellulose was ethyl cellulose obtained from the Dow Chemical Co. under the designation "Ethocel". Water was used as the solvent at 12 weight percent of the damp mix.

Example 17 was carried out the same as Example 15 except that shellac in an ethanol solution was used as the agglomerating agent. The shellac was present at about 5 weight percent of the agglomerated acesulfame K particles. The ethanol solvent was present at 4 weight percent of the damp mix.

Example 18 was carried out the same as Example 17 except that after the agglomerated particles were dried and ground, they were treated by the same process to put a second coat of shellac on the particles. In the second pass, the ethanol was present at 7 weight percent of the damp mix. The final particles comprised 12 to 14 weight percent of the twice coated acesulfame K.

Example 19 was carried out the same as Example 2 except that citric acid was used as the ingredient. The citric acid was obtained from Pfizer, Chemical Division as anhydrous citric acid powder. The E4M HPMC described above was used for the agglomerating agent and was added at 30 weight percent of the agglomerated citric acid. The water was present at 22 weight percent of the damp mix.

Example 20 was carried out the same as Example 2 except that tartaric acid was used as the ingredient. The tartaric acid was obtained from Pfizer, Chemical Division as synthetic L-tartaric acid. The E4M was present at 15 weight percent of the agglomerated tartaric acid. The water was present at 16 weight percent of the damp mix.

Example 21 was carried out the same as Example 2 except that ascorbic acid was used as the ingredient. The ascorbic acid was obtained from Hoffmann LaRoche as a fine powder. The E4M was present at 15 weight percent of the ascorbic acid. Water was present at 22 weight percent of the damp mix.

An experiment was conducted to measure the release profile of products made according to the invention when incorporated in a chewing gum. The experiment consisted of making a batch of chewing gum with the product of Examples 1, 2, 5, 9 and 10 as the sweetener. Chewing gums with untreated aspartame and conventionally, i.e. fluid bed coated, aspartame were also tested. In particular, in each of the gums tested the level of aspartame (without counting the agglomerating agent) was set at 0.18 percent by weight of the gum. For the gums made with the sweetener of Example 1, 9 and 10, the agglomerated sweetener comprised 0.21 percent by weight of the gum. The gum made with the product of Example 2 included 0.26 weight percent of the agglomerated sweetener. The gum made with the product of Example 5 included 0.45 weight percent zein agglomerated sweetener. The gum formulation was identical in each batch with the exception that the sweetener was changed in each instance.

Figure 3B:
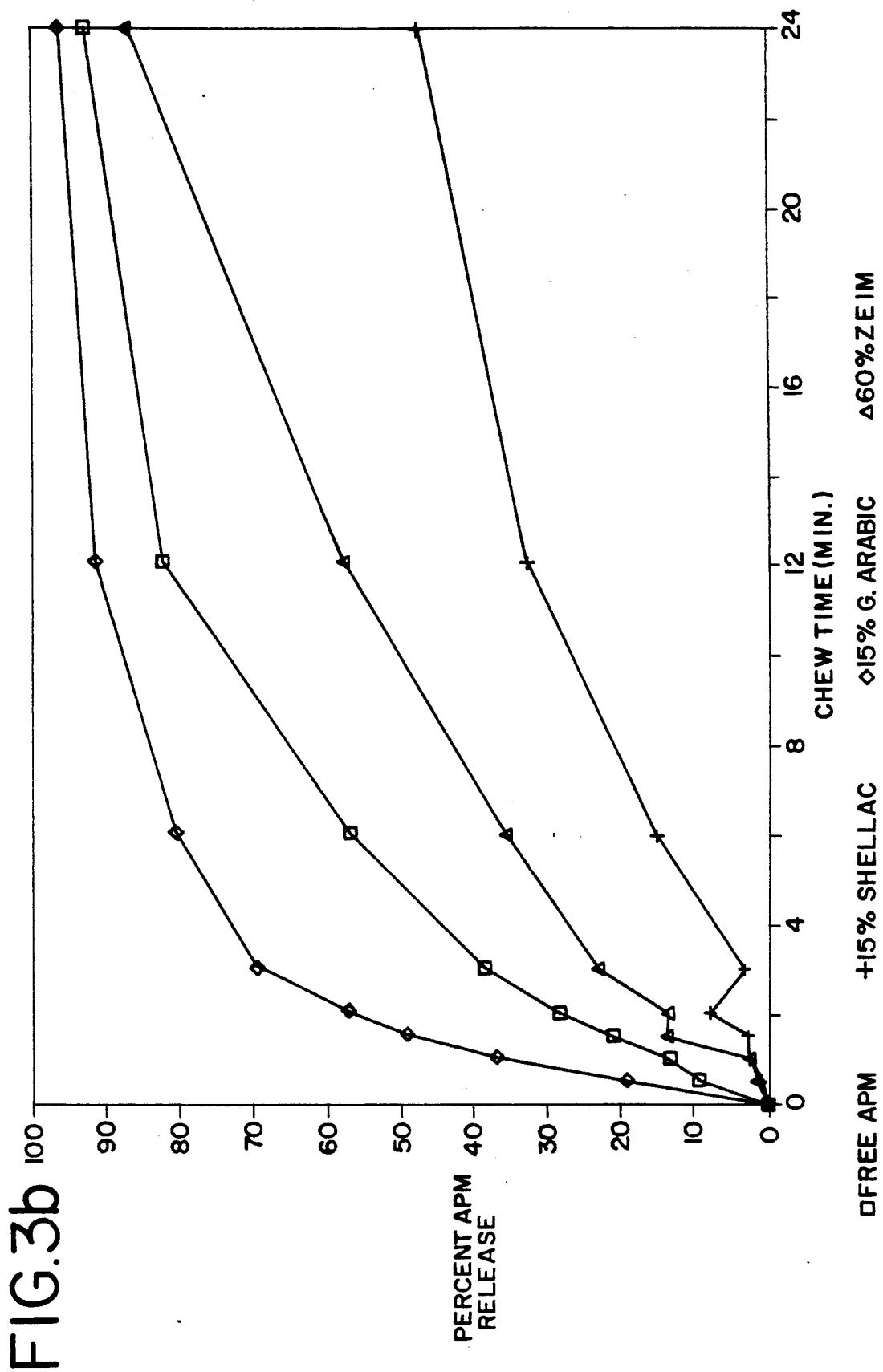

2.8 g. sticks of the gum were chewed by 4 subjects for specified time periods and then collected. The collected pieces were then analyzed for the amount of aspartame remaining in the gum. As a result, it was determined how much of the aspartame had been released from the gum at 0.0, 0.5, 1, 1.5, 2, 3, 6, 12 and 24 minutes. These results are depicted in the graphs of FIGS. 3a and 3b.

In FIG. 3a, the open squares represent the levels observed for the aspartame release when the aspartame was untreated. The "." symbols represent the levels observed for the gum containing aspartame having a 15 weight percent coating of shellac applied by a conventional fluid bed technique. The diamond symbols represent the levels observed for the 15 weight percent HPMC product of the present invention. The triangles represent the levels observed for the 30 weight percent HPMC product of the present invention.

As can be seen in FIG. 3a, the product of Example 1 has a slower release from chewing gum than does free aspartame. In particular, within the first 3 minutes, the gum with untreated aspartame had released about 38 percent of the aspartame while the product of Example 1 had released only 26 percent.

FIG. 3a also compares the release rate of products of the invention with that for a conventionally coated aspartame. As can be seen, the release rate for the fluid bed coated aspartame is slower than that for the product of Example 1, but not as much as would be expected. That is, it was a surprise to the inventor that the process of this invention, which process is easier and less expensive than fluid bed coating, produced an ingredient with a controlled release which was this similar to what was being produced by fluid bed coating.

FIG. 3a also shows that the release rate of the product of Example 2 is lower than that for the product of Example 1. It is also seen that the process of the present invention can be adjusted to achieve a release rate which is lower than that of the conventionally coated aspartame.

FIG. 3b compares the release rates of gums made with the products of Examples 5, 9 and 10 with the release rate of untreated aspartame. As can be seen the release of aspartame can be varied greatly by the present invention. The product of Example 10 which was coated with 15 weight percent gum arabic, the diamonds on the graph, actually showed an increased rate of release. The product of Example 5, i.e. agglomerated with 60 weight percent zein, the triangles on the graph, produced a delayed release of the aspartame. Finally, the product of Example 9, i.e. agglomerated with 15 weight percent shellac, the "." symbols on the graph, showed the greatest reduction in release rate.

Each of the agglomerated powders made in the examples described above was tested to determine its handling ability. Each powder was tested to determine its angle of repose and its tapped bulk density.

The angle of repose was measured by pouring a quantity of the powder through a 6 cm funnel which had an outlet 1.27 cm about the inlet of a 7 cm funnel which in turn had its outlet 2.54 cm above a flat level plate. The height and radius of the mound formed on the plate were measured. The angle was obtained by taking the arctangent of the height divided by the radius.

The tapped bulk density was measured by placing 25 ml of the powder in a graduated cylinder and then tapping the cylinder on the table 40 times to allow for settling. More powder was added to the cylinder which was then tapped another 25 times. Any powder in excess of 25 ml was removed and the cylinder was weighed. the weight was multiplied by 4 to obtain the tapped bulk density as the weight in grams for 100 ml of the powder.

The following table summarizes the results for each of the examples listed above. In addition, the values for the untreated powders are also included.

TABLE

| # | Ingredient | Agent | Solvent | Amount | Angle | Density* |
|---|---|---|---|---|---|---|
|  | aspartame | None |  |  | 46.8 | 32.6 |
| 1 | " | HPMC | H₂O | 15% | 39.4 | 56.6 |
| 2 | " | HPMC | H₂O | 30% | 36.7 | 47.8 |
| 3 | " | HPMC | Sol 70 | 15% | 40.1 | 66.9 |
| 4 | " | HPMC | H₂O | 7% | 40.1 | 48.5 |
| 5 | " | zein | EtOH | 60% | 31.1 | 66.0 |
| 6 | " | zein | EtOH | 40% | 31.6 | 60.3 |
| 7 | " | zein** | H₂O | 60% | 30.6 | 48.7 |
| 8 | " | zein** | EtOH | 60% | 34.8 | 55.5 |
| 9 | " | shellac | EtOH | 15% | 27.8 | 65.7 |
| 10 | " | gum arabic | H₂O | 15% | 45.0 | 46.8 |
| 11 | " | gum arabic | EtOH | 15% | 38.7 | 51.5 |
| 12 | " | maltrin | H₂O | 15% | 45.0 | 58.8 |
| 13 | " | Binasol | H₂O | 15% | 44.1 | 46.4 |
| 14 | " | gelatin | H₂O | 15% | 36.7 | 57.3 |
|  | acesulfame K | None |  |  | 30.2 | 126.8 |
| 15 | " | zein | EtOH | 60% | 33.2 | 65.3 |
| 16 | " | ethocel | EtOH | 15% | 34.8 | 79.0 |
| 17 | " | shellac | EtOH | 5% | 34.2 | 103.4 |
| 18 | " | shellac | EtOH | 12%*** | 32.6 | 92.2 |
|  | citric Acid | None |  |  | no flow | 61.2 |
| 19 | citric Acid | HPMC | H₂O | 30% | 29.7 | 74.3 |
|  | tartaric Acid | None |  |  | no flow | 70.4 |
|  | tartaric Acid | HPMC | H₂O | 15% | 31.6 | 78.2 |
| 20 | tartaric Acid | HPMC | H₂O | 15% | 31.6 | 78.2 |
|  | ascorbic Acid | None |  |  | no flow | 85.3 |
| 21 | ascorbic Acid | HPMC | H₂O | 15% |  | 70.3 |

*tapped bulk density in g./100 ml
**fine grade zein powder
***two coats of shellac applied in two granulating processes In summary, a relatively simple and inexpensive process has been described for producing controlled release ingredients for chewing gum. Although specific embodiments and examples have been described herein, it should be born in mind that these have been provided by way of explanation and illustration and that the present invention is not limited thereby. Certainly modifications which are within the ordinary skill in the art to make are considered to lie within the scope of the invention as defined by the following claims, including all equivalents.

I claim:

1. A method for producing a chewing gum including a delayed release ingredient comprising the following steps:
   mixing a quantity of an uncoated powdered chewing gum ingredient with a quantity of an agglomerating agent, said agent being selected from the group consisting of modified celluloses, starches, gelatins, zein, and shellac, as well as mixtures thereof, and a quantity of solvent limited to that amount sufficient to produce a damp mix which is dust free, non-flowing, and crumbly;
   drying said damp mix;
   comminuting said dried mix to thereby obtain agglomerated particles of the ingredient within a particle size range suitable for use in chewing gum;
   said agglomerated particles comprising between about 35 and about 99 percent by weight of said chewing gum ingredient which is at least partially coated by said agglomerating agenta nd is thereby adapted to produce a delayed release of the ingredient when used in chewing gum without a further coating; and
   adding said agglomerated particles without a further coating to a chewing gum formulation.

2. The method of claim 1 wherein said ingredient is selected from the group consisting of sweeteners, flavors, and acidulants, as well as mixtures thereof.

3. The method of claim 2 wherein said ingredient is a high-potency sweetener.

4. The method of claim 3 wherein said high-potency sweetener is aspartame.

5. The method of claim 4 wherein said agglomerating agent is hydroxypropyl methylcellulose.

6. The method of claim 5 wherein said hydroxypropyl methylcellulose is added in an amount between about 5 percent and about 50 percent by weight of the agglomerated aspartame.

7. The method of claim 6 wherein the solvent is added in an amount between about 20 and about 55 percent by weight of the damp mix.

8. The method of claim 1 wherein said agglomerating agent is hydroxypropyl methylcellulose.

9. The method of claim 8 wherein said hydroxypropyl methylcellulose is added in an amount between about 5 percent and about 50 percent by weight of the agglomerated ingredient.

10. The method of claim 9 wherein the solvent is added in an amount between about 20 and about 55 percent by weight of the damp mix.

11. A method for producing a chewing gum including a delayed release ingredient comprising the follown g steps:
   dry blending a quantity of an uncoated powdered chewing gum ingredient, said ingredient selected from the group consisting of sweeteners, flavors, acidulants, and medicaments, as well as mixtures thereof, with a quantity of a powdered agglomerating agent, said agent being selected from the group consisting of modified celluloses, starches, gelatins, zein, and shellac, as well as mixtures thereof;
   gradually adding a limited quantity of solvent to the mixture of chewing gum ingredient and agglomerating agent in an amount sufficient to create a damp mix which is dust free, non-flowing, and crumbly;
   drying said damp mix;
   comminuting said dried mix to thereby create agglomerated particles within a particle size range suitable for use in chewing gum, and said particles comprising between about 35 and about 99 percent by weight of said chewing gum ingredient which is at least partially coated by said agglomerating agent and is thereby adapted to produce a delayed release when incorporated in chewing gum without a further coating; and
   adding said agglomerated particles without a further coating to a chewing gum formulation.

12. The method of claim 11 wherein said ingredient is a high-potency artificial sweetener.

13. The method of claim 12 wherein said high-potency artificial sweetener is aspartame.

14. The method of claim 13 wherein said agglomerating agent is hydroxypropyl methylcellulose.

15. The method of claim 14 wherien siad hydroxypropyl methylcellulose is added in an amount between about 5 percent and about 50 percent by weight of the agglomerated aspartame.

16. The method of claim 14 wherein the solvent is added in an amount between about 20 and about 55 percent by weight of the damp mix.

17. The method of claim 11 wherein said agglomerating agent is hydroxypropyl methylcellulose.

18. The method of claim 17 wherein said hydroxypropyl methylcellulose is added in an amount between about 5 percent and about 50 percent by weight of the agglomerated ingredient.

19. The method of claim 17 wherein the solvent is added in an amount between about 20 and about 55 percent by weight of the damp mix.

20. A method for producing chewing gum including delayed release aspartame comprising the steps of:
   dry blending a quantity of powdered uncoated aspartame with a quantity of a powdered hydroxypropyl methylcellulose as an agglomerating agent;
   adding a limited amount of solvent to the mixture of aspartame and hydroxypropyl methylcellulose in an amount sufficient to produce a damp mix which has a solvent content between about 30 and about 40 percent by weight of the damp mix, and which damp mix is dust-free, non-flowing, and crumbly;
   drying said damp mix to remove substantially all of said solvent;
   comminuting said dried mix to thereby produce agglomerated particles of aspartame within a particle size range suitble for use in chewing gum, which particles comprises between about 35 and about 99 percent by weight aspartame which is at least partially coated by hydroxypropyl methylcellulose and is thereby adapted to produce a delayed releas of the aspartame when used in chewing gum without a further coating; and
   adding said agglomerated particles of aspartame without a further coating to a chewing gum formulation.

21. The method of claim 20 wherein the hydroxypropyl methylcellulose is added in an amount between about 10 and about 30 percent of the agglomerated aspartame.

22. A method for producing chewing gum including a delayed release ingredient comrising the following steps:
   mixing a quantity of an uncoated powdered chewing gum ingredient with a quantity of a carbohydrate syrup to produce a damp mix, the damp mix being characterized as being dust free, non-flowing, and crumbly;
   drying said damp mix;
   particle sizing said dried mix to thereby obtain agglomerated particles of the ingredient within a particle size range suitable for use in chewing gum;
   said agglomerated particles comprising between about 35 and about 99 percent by weight of said chewing gum ingredient which is at least partially coated by the agglomerating agent and is thereby adapted to produce a delayed release of the ingredient when used in chewing fum without a further coating; and
   adding said agglomerated particles without a further coating to a chewing gum formulation.

23. A method for producing a chewing gum including a delayed relaese ingredient comprising the following stesps:
   mixing a quantity of an uncoated powdered chewing gum ingredient with a quantity of an agglomerating agent, said agent being selected from the group consisting of modified celluloses, starches, gelatins, zein, and shellac, as well as mixtures thereof, and a quantity of solvent limited to that amount sufficient to produce a damp mix which is dust free, non-flowing, and crumbly;
   drying said damp mix;
   comminuting said dried mix to thereby obtain a quantity of agglomerated particles of the ingredient within a particle size range suitable for use in chewing gum;
   said quantity of agglomerated particles comprising between about 35 and about 99 percent by weight of said chewing gum ingredient, which ingredient in at least some agglomerated particles of said quantity of agglomerated particles are only partially coated by said agglomerating agent, said quantity of particles being thereby adapted to produce a delayed release of the ingredient when used in chewing gum without a further coating; and adding said quantity of particles without a further coating to a chewing gum formulation.

24. The method of claim 23 wherien uncoated chewing gum ingredient particles are present with the quantity of agglomerated particles following the comminuting step.

25. The method of claim 23 wherein some of said agglomeated particles of said quantity of agglomerated particles are completely coated by said agglomerating agent.

26. The method of claim 25 wherein uncoated chewing gum ingredient particles are present with the quantity of agglomerated particles following the comminuting step.

* * * * *

UNITED STATES PATENT AND TRADEMARK OFFICE
CERTIFICATE OF CORRECTION

PATENT NO. : 5,217,735
DATED : June 8, 1993
INVENTOR(S) : Steven E. Zibell

It is certified that error appears in the above-indentified patent and that said Letters Patent is hereby corrected as shown below:

ON THE TITLE PAGE: Item [56],

Under the heading "U.S. PATENT DOCUMENTS", please add:

--4,269,860    5/1981    Ogawa et al. . . . . . . . .    426/1034
  4,556,565   12/1985    Arima et al. . . . . . . . .    426/548X
  4,568,560    2/1986    Schobel  . . . . . . . . .      426/5X --.

Column 1, line 41, delete "sweetenercontaining" and substitute --sweetener-containing--.

Column 1, line 60, delete "tc" and substitute --to--.

Column 2, line 14, after "steps" insert --.--.

Column 3, line 16, delete "FIGS." and substitute --FIG.--.

Column 3, line 20, delete "FIG." and substitute --FIGS.--.

Column 3, line 37, delete "sacharine" and substitute --saccharine--.

Column 3, line 47, after "of the" insert --aspartame--.

Column 3, line 48, after "present" insert --process.--.

Column 3, line 52, after "density" insert --.--.

Column 3, line 65, after "process" insert --.--.

Column 4, line 34, after "selected" insert --.--.

UNITED STATES PATENT AND TRADEMARK OFFICE
CERTIFICATE OF CORRECTION

PATENT NO. : 5,217,735
DATED : June 8, 1993
INVENTOR(S) : Steven E. Zibell

It is certified that error appears in the above-indentified patent and that said Letters Patent is hereby corrected as shown below:

Column 7, line 59, after "release" insert --than--.
Column 8, line 4, after "shown" insert --in--.
Column 8, line 33, delete "170o" and substitute --170°--.
Column 8, line 66, delete "show" and substitute --shown--.
Column 10, line 57, delete " "." " and substitute --"+"--.
Column 11, line 30, delete " "." " and substitute --"+"--.
Column 12, line 15 (in the Table above #20), please delete "   tartaric Acid    HPMC    H₂0    15%    31.6    78.2".
Column 12, line 26, delete "born" and substitute --borne--.

Col. 12, Claim 1, line 52, delete "agenta nd" and substitute --agent and--.
Col. 14, Claim 20, line 11, delete "suitble" and substitute --suitable--.
Col. 14, Claim 20, line 12, delete "comprises" and substitute --comprise--.
Col. 14, Claim 20, line 15, delete "releas" and substitute --release--.
Col. 14, Claim 22, line 26 delete "comrising" and substitute --comprising--.
Col. 14, Claim 22, line 42, delete "fum" and substitute --gum--.

UNITED STATES PATENT AND TRADEMARK OFFICE
CERTIFICATE OF CORRECTION

PATENT NO. : 5,217,735
DATED : June 8, 1993
INVENTOR(S) : Steven E. Zibell

It is certified that error appears in the above-indentified patent and that said Letters Patent is hereby corrected as shown below:

Col. 14, Claim 23, line 47, delete "relaese" and substitute --release--.

Col. 14, Claim 23, line 48, delete "stesps" and substitute --steps--.

Col. 15, Claim 24, line 5, delete "wherien" and substitute --wherein--.

Col. 16 Claim 25, line 2, delete "agglomeated" and substitute --agglomerated--.

Signed and Sealed this

Thirteenth Day of December, 1994

Attest:

BRUCE LEHMAN

Attesting Officer  Commissioner of Patents and Trademarks